United States Patent
Krishnamurthy et al.

(10) Patent No.: US 12,004,000 B2
(45) Date of Patent: Jun. 4, 2024

(54) CAPABILITY MANAGEMENT FOR CONCURRENCY MODE CONTROL

(71) Applicant: QUALCOMM Incorporated, San Diego, CA (US)

(72) Inventors: Subashini Krishnamurthy, San Diego, CA (US); Qingxin Chen, San Diego, CA (US); Murali Bharadwaj, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 10 days.

(21) Appl. No.: 17/495,734

(22) Filed: Oct. 6, 2021

(65) Prior Publication Data

US 2022/0110015 A1   Apr. 7, 2022

Related U.S. Application Data

(60) Provisional application No. 63/088,871, filed on Oct. 7, 2020.

(51) Int. Cl.
*H04W 28/02* (2009.01)
*H04W 12/45* (2021.01)
*H04W 28/18* (2009.01)
*H04W 36/00* (2009.01)
*H04W 48/00* (2009.01)
*H04W 72/54* (2023.01)
(Continued)

(52) U.S. Cl.
CPC ....... *H04W 28/0215* (2013.01); *H04W 28/18* (2013.01); *H04W 36/0069* (2018.08); *H04W 48/17* (2013.01); *H04W 72/54* (2023.01); *H04W 76/15* (2018.02); *H04W 76/30* (2018.02); *H04W 12/45* (2021.01)

(58) Field of Classification Search
None
See application file for complete search history.

(56) References Cited

U.S. PATENT DOCUMENTS 8,982,836 B2 * 3/2015 Zhao ............... H04W 36/0011
370/331
2009/0270103 A1   10/2009 Pani et al.
2012/0040670 A1   2/2012 Chin et al.
(Continued)

FOREIGN PATENT DOCUMENTS

EP   1653646 A1   5/2006
EP   2578034 A1   4/2013
EP   2919542 A1   9/2015

OTHER PUBLICATIONS

International Search Report and Written Opinion—PCT/US2021/053975—ISA/EPO—dated Jun. 1, 2022
(Continued)

*Primary Examiner* — Jutai Kao
(74) *Attorney, Agent, or Firm* — Patterson & Sheridan LLP

(57) ABSTRACT

A wireless communication device is described. The wireless communication device includes a processor configured to determine a switch between an independent mode and a concurrency mode. The wireless communication device also includes a transmitter configured to send a communication capability signal to a base station in response to the switch. The communication capability signal indicates a resource communication capability adjustment for a first service.

22 Claims, 9 Drawing Sheets

(51) Int. Cl.
*H04W 76/15* (2018.01)
*H04W 76/30* (2018.01)

(56) References Cited

U.S. PATENT DOCUMENTS

| | | | |
|---|---|---|---|
| 2017/0366235 A1 | 12/2017 | Kim et al. | |
| 2018/0227902 A1* | 8/2018 | Gholmieh | H04W 72/08 |
| 2020/0037380 A1* | 1/2020 | Qiu | H04W 68/005 |
| 2021/0368327 A1* | 11/2021 | Gao | H04W 24/08 |
| 2022/0078703 A1* | 3/2022 | Xia | H04W 52/028 |
| 2022/0386105 A1* | 12/2022 | Jung | H04W 12/45 |
| 2023/0224690 A1* | 7/2023 | Yukimasa | H04M 11/00 |
| | | | 455/419 |
| 2023/0328808 A1* | 10/2023 | Hong | H04W 76/10 |
| | | | 455/422.1 |

OTHER PUBLICATIONS

Partial International Search Report—PCT/US2021/053975—ISA/EPO—dated Feb. 23, 2022.

* cited by examiner

CAPABILITY MANAGEMENT FOR CONCURRENCY MODE CONTROL

CROSS-REFERENCE TO RELATED APPLICATIONS

This application claims the benefit of and priority to U.S. Provisional Application No. 63/088,871, filed Oct. 7, 2020, which is hereby assigned to the assignee hereof and hereby expressly incorporated by reference herein in its entirety as if fully set forth below and for all applicable purposes.

FIELD OF DISCLOSURE

The present disclosure relates generally to electronic devices. More specifically, the present disclosure relates to capability management for concurrency mode control.

BACKGROUND

In the last several decades, the use of electronic devices has become common. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform new functions and/or that perform functions faster, more efficiently, or with higher quality are often sought after.

Some electronic devices (e.g., cellular phones, smartphones, laptop computers, etc.) communicate with other electronic devices. For example, electronic devices may transmit and/or receive radio frequency (RF) signals to communicate. Improving electronic device communication may be beneficial.

SUMMARY

One aspect includes a wireless communication device, comprising a processor configured to determine a switch between an independent mode and a concurrency mode, and a transmitter configured to send a communication capability signal to a base station in response to the switch, wherein the communication capability signal indicates a resource communication capability adjustment for a first service.

One aspect includes a method performed by a wireless communication device, comprising determining a switch between an independent mode and a concurrency mode, and sending a communication capability signal to a base station in response to the switch, wherein the communication capability signal indicates a resource communication capability adjustment for a first service.

One aspect includes a non-transitory tangible computer-readable medium storing computer-executable code, comprising code for causing a processor to determine a switch between an independent mode and a concurrency mode, and code for causing the processor to control a transmitter to send a communication capability signal to a base station in response to the switch, wherein the communication capability signal indicates a resource communication capability adjustment for a first service.

One aspect includes an apparatus, comprising means for determining a switch between an independent mode and a concurrency mode, and means for sending a communication capability signal to a base station in response to the switch, wherein the communication capability signal indicates a resource communication capability adjustment for a first service.

Other aspects include: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

DETAILED DESCRIPTION

Figure 1:
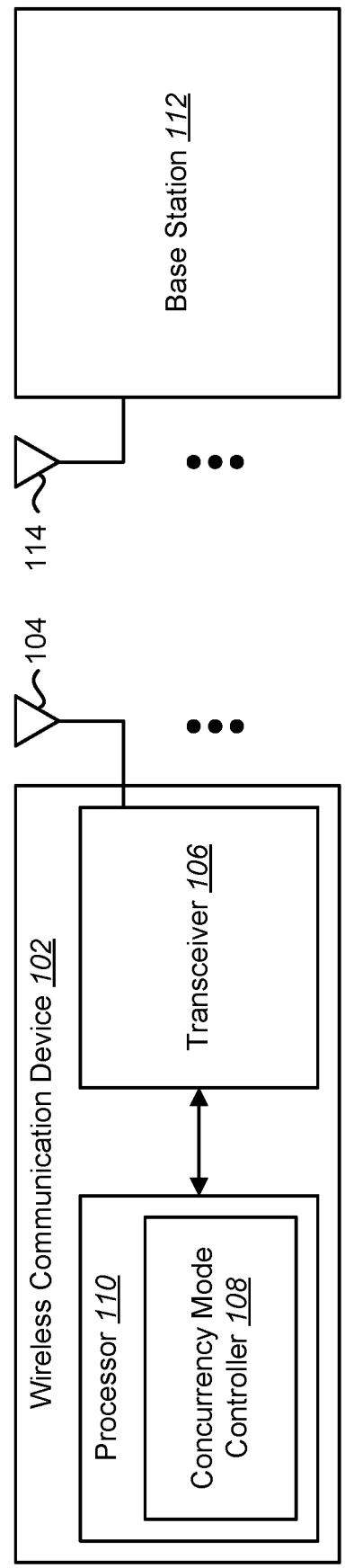
FIG. 1 is a block diagram illustrating one example of a wireless communication device in which systems and methods for capability management may be implemented.

Some examples of the systems and methods disclosed herein relate to capability management for concurrency mode control. For instance, some of the techniques described herein may provide dynamic capability management in various modem concurrency modes.

A wireless communication device is an electronic device that may communicate with another device using radio frequency (RF) signals. Examples of the wireless communication devices include smartphones, tablet devices, laptop computers, mobile devices, vehicles, autonomous vehicles, user equipments (UEs), telematics units, embedded devices, etc. In some examples, a wireless communication device (e.g., embedded device, telematics unit, mobile device, etc.) may execute and/or utilize various radio technologies like Global System for Mobile Communication (GSM), third-generation wireless (3G) (e.g., Universal Mobile Telecommunications System (UMTS), Code Division Multiple Access 2000 (CDMA2000), Wideband Code Division Multiple Access (WCDMA), etc.), fourth-generation wireless (4G) (e.g., Long Term Evolution (LTE), etc.), fifth-generation wireless (5G) (e.g., New Radio (NR), etc.), Cellular Vehicle-to-Everything (C-V2X) in an independent mode (e.g., single technology mode) or in a concurrency mode. An independent mode may be a mode of operation where a wireless communication device (e.g., modem) communicates with one service (e.g., one subscription and/or technology). A concurrency mode may be a mode of operation where a wireless communication device (e.g., modem) communicates with multiple services (e.g., subscriptions and/or technologies) concurrently (e.g., in overlapping time periods).

The maximum capability of a wireless communication device regardless of the mode of operation may be determined in accordance with the underlying baseband and/or RF resources. Modem processing restrictions may arise due to available million instructions per second (MIPS) headroom for a modem in a mode. In some approaches, a static modem envelope may be negotiated with a network (e.g., base station, eNode B (eNB), gNode B (gNB), etc.) for a multi-subscriber identity module (SIM) wireless communication device in various configurations (e.g., single SIM mode, single SIM and C-V2X (single SIM+C-V2X) mode, dual SIM dual active (DSDA) mode, or DSDA and C-V2X (DSDA+C-V2X) mode) may not be optimal with regard to achievable throughputs. A tradeoff may exist between reduced complexity versus achievable throughputs with dynamic adjustment based on the scenario (that may operate under maximum modem envelope constraints, for instance). As used herein, the term "envelope" may refer to one or more resources (e.g., carrier(s), layer(s), stream(s), path(s), slot(s), etc.) and/or may be associated with one or more resources allocated for communication. It may be beneficial to negotiate a maximum modem envelope with a network for various services (e.g., 5G sub-6 gigahertz (GHz), LTE (in Evolved UMTS Terrestrial Radio Access (EUTRA)-NR dual connectivity (ENDC) mode, for instance), standalone LTE, and/or standalone 5G (e.g., NR)).

A device operating in a concurrent 4G and 5G mode may be able to support higher capabilities specific to a service. For example, a concurrent 5G mode may support greater capabilities in terms of number of carriers (e.g., carrier aggregation (CA), number of receive streams or paths, and/or number of receive layers that may impact multiple-input multiple-output (MIMO) capability when compared to a device operating in a concurrency mode such as 4G and C-V2X or DSDA mode (where one or both subscriptions are on 4G or 5G, for instance). In some examples, receive streams may provide improved error correction. In some examples, with receive layers, MIMO may be achieved with parallel streams on data.

As used herein, "service" may refer to a subscription and/or technology. For example, a subscription may refer to access to a wireless network. For instance, a SIM on a wireless communication device may provide an identity that permits access to a wireless network or networks. Accessing (e.g., communicating with) the wireless network using an identity that permits access may be referred to as communicating with a subscription. In some examples, a technology may refer to a radio access technology (RAT) and/or radio access network (RAN). Examples of RATs and/or RANs may include cellular wireless technologies (e.g., 3G, UMTS, 4G, LTE, 5G, NR, etc.) and/or other wireless technologies (e.g., Institute of Electrical and Electronics Engineers (IEEE) 802.11 (Wi-Fi), Bluetooth, etc.). Communicating with a device or devices (e.g., base station(s), access point(s), RAN(s), etc.) using a RAT may be referred to as communicating with a technology. Communicating using a subscription and/or RAT may be referred to as communicating with a service. In some examples, multiple services may be provided by one base station. In some examples, different base stations may be provided different services. Accordingly, concurrency mode may occur when a wireless communication device is communicating with multiple services provided by one or more base stations and/or networks. Examples of services may include single SIM, C-V2X, 5G, 5G DSDA, 4G, 4G DSDA, etc. A concurrency mode may occur when a wireless communication device communicates with multiple (e.g., two or more) services concurrently.

When conditions arise to deactivate a specific service (e.g., subscription and/or technology) and switch the wireless communication device from a concurrency mode to an independent mode (e.g., non-concurrency mode), one or more baseband resources may be freed and/or available for the wireless communication device to support higher capabilities. In some approaches, a wireless communication device may enter a capability exchange procedure during registration with the network to inform the network regarding a number of carriers for carrier aggregation and/or a number of layers (e.g., receive layers transmitted from a network) for MIMO that the wireless communication device is capable of utilizing. During a switch from one mode to another (between concurrency mode and independent mode), the capabilities of the wireless communication device may change from a perspective of available capabilities.

In some approaches, to allow dynamic mode switching, a wireless communication device may advertise a minimum set of capabilities supported based on a potential highest level of concurrency mode, even if the wireless communication device is not currently in that concurrency mode. In some cases, these approaches may restrict the wireless communication device from achieving increased (e.g., maximum) throughput in a mode, since the capability advertised to the network may be much lower than what the wireless communication can actually support.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one example of a wireless communication device 102 in which systems and methods for capability management may be implemented. The wireless communication device 102 is a device or apparatus for transmitting and/or receiving RF signals. Examples of the wireless communication device 102 include UEs, smartphones, tablet devices, computing devices, computers (e.g., desktop computers, laptop computers, etc.), televisions, cameras, virtual reality devices (e.g., headsets), telematics units, embedded devices (e.g., telematics unit embedded in a vehicle), vehicles (e.g., semi-autonomous vehicles, autonomous vehicles, etc.), robots, aircraft, drones, unmanned aerial vehicles (UAVs), healthcare equipment, gaming consoles, Internet of Things (IoT) devices, etc. The wireless communication device 102 includes one or more components or elements. One or more of the components or elements (e.g., concurrency mode controller 108) may be implemented in hardware (e.g., circuitry) or a combination of hardware and instructions (e.g., a processor with software and/or firmware stored in memory).

In some examples, the wireless communication device 102 includes one or more antennas 104, a transceiver 106, and/or a processor 110. In some examples, the wireless communication device 102 includes one or more components and/or elements. For example, the wireless communication device 102 may include an RF front end (RFE), switch(es), filter(s), power amplifier(s), downconverter(s), upconverter(s), memory, and/or display (e.g., touchscreen), etc.

The transceiver 106 may be configured to send one or more signals to one or more other devices (e.g., base station 112) and/or to receive one or more signals from one or more other devices (e.g., base station 112). For example, a base station 112 may utilize one or more antennas 114 to transmit one or more signals to the wireless communication device 102 and/or to receive one or more signals from the wireless communication device 102. The transceiver 106 may include a transmitter (to send signal(s), for example) and/or a receiver (to receive signal(s), for example). In some examples, the transceiver 106 may be coupled to one or more antennas 104 for transmitting and/or receiving signals. The transceiver 106 may be circuitry configured to perform one or more functions. For example, the transceiver 106 may include one or more integrated circuits with circuit components (e.g., transistors, resistors, capacitors, etc.). For instance, the transceiver 106 may include one or more power amplifiers, switches (for antenna port switching, for instance), filters, low-noise amplifiers, etc. The antenna(s) 104 may radiate one or more signals (e.g., electromagnetic signals, RF signals, wireless signals, etc.) provided by the transceiver 106. In some examples, the antenna(s) 104 may be utilized to receive one or more signals (e.g., configuration signals) from another device or devices (e.g., base station 112). For instance, the antenna(s) 104 may provide received signals to the transceiver 106 of the wireless communication device 102.

The processor 110 may be hardware (e.g., circuitry, transistors, etc.) for performing one or more operations. In some examples, the processor 110 may be one or more modems (e.g., modem processors) for performing operations (e.g., modulation, encoding, precoding, formatting, demodulation, decoding, etc.). For instance, the processor 110 may perform one or more operations on one or more signals and provide the signal(s) to the transceiver 106 for transmission. In some examples, the processor 110 may control one or more aspects of transceiver 106 operation. For instance, the processor 110 may control antenna port switching, filter tuning, etc., to enable transmission and/or reception on one or more carriers and/or MIMO layers. In some examples, the processor 110 may perform one or more operations on received signals from a receiver. For instance, the processor 110 may perform demodulation, detection, decoding, etc., and/or may convert the signal(s) or portions of the signal(s) into data (e.g., bits).

In some examples, the processor 110 executes instructions to perform the one or more functions. In some examples, the processor 110 includes one or more functionalities that are structurally implemented as hardware (e.g., circuitry). In some examples, the processor 110 includes a baseband processor, a modem processor, an application processor, and/or any combination thereof. In some examples, the wireless communication device 102 and/or the processor 110 may be configured to perform one or more of the methods 200, 500, 700, 800 and/or one or more portions of method(s), function(s), and/or operation(s) described in relation to one or more of the Figures. In some examples, the wireless communication device 102 and/or processor 110 includes one or more of the components and/or elements described in relation to one or more of the Figures.

In some examples, the wireless communication device 102, processor 110, and/or transceiver 106 may implement one or more aspects of one or more specifications (e.g., 3rd Generation Partnership Project (3GPP) Release 15, 3GPP Release 16, fifth generation (5G), New Radio (NR), and/or Long-Term Evolution (LTE), etc.). In some examples, the wireless communication device 102 transmits signals to one or more base stations (e.g., base station 112) and/or receives signals from one or more base stations (e.g., base station 112). For instance, the wireless communication device 102 may transmit signals to and/or may receive signals from one or more RANs, eNBs, gNBs, cellular networks, etc. In some examples, the wireless communication device 102 also communicates with one or more other radio access technologies (RATs) (e.g., wireless local area network (WLAN), Wi-Fi network, personal area network (PAN), and/or Bluetooth, etc.).

The processor 110 is configured to determine a switch between an independent mode and a concurrency mode. For example, the processor 110 may include a concurrency mode controller 108 that determines a switch between an independent mode and a concurrency mode (e.g., a switch from an independent mode to a concurrency mode or a switch from a concurrency mode to an independent mode). In some examples, a switch determination may refer to a determination to start communicating with a second service (e.g., subscription and/or technology) in addition to current communications with a first service (e.g., switching to a concurrency mode), and/or may refer to a determination to discontinue current communications with a second service while continuing communications with a first service (e.g., switching to an independent mode).

In some examples, a switch may be determined based on received signaling and/or one or more conditions on the wireless communication device 102. For instance, the wireless communication device 102 may scan for a signal and/or receive a signal corresponding to a service or services (e.g., base station 112, other base station(s), access point(s), etc.). In some examples, the wireless communication device 102 (e.g., processor 110 and/or concurrency mode controller 108) may determine to switch to a concurrency mode (e.g., communicate with an additional service) when an additional service sends a signal indicating data (e.g., voice data, voice call, text, short message service (SMS) data, email, notification data, video call, video, vehicle data (e.g., vehicle coordination data, safety data, navigation data, etc.), gaming data, and/or other data) for the wireless communication device 102. In some examples, the wireless communication device 102 (e.g., processor 110 and/or concurrency mode controller 108) may determine to switch to a concurrency mode when a condition on the wireless communication device 102 indicates a trigger, instruction, etc., to communicate with an additional service. For instance, the wireless communication device 102 (e.g., processor 110 and/or concurrency mode controller 108) may determine a switch to concurrency mode when an additional SIM card is inserted to the wireless communication device 102 and/or when an additional SIM is activated. In some examples, a first service may correspond to a first SIM, and the processor 110 may determine the switch in response to a second SIM activation. Examples of switch determination to enter a concurrency mode are given below.

In some examples, the wireless communication device 102 (e.g., processor 110 and/or concurrency mode controller 108) may determine a switch to an independent mode based on received signaling and/or one or more conditions on the wireless communication device 102. For instance, the wireless communication device 102 may lose a signal corresponding to a service or services (e.g., base station 112, other base station(s), access point(s), etc.) and/or may receive a signal indicating an end of service, a disconnection, and/or a detachment corresponding to a service or services. In some examples, the wireless communication device 102 (e.g., processor 110 and/or concurrency mode controller 108) may determine to switch to an independent mode (e.g., discontinue communicating with an additional service) when an additional service has finished sending data (e.g., voice data, voice call, text, short message service (SMS) data, email, notification data, video call, video, vehicle data (e.g., vehicle coordination data, safety data, navigation data, etc.), gaming data, and/or other data) for the wireless communication device 102. In some examples, the wireless communication device 102 (e.g., processor 110 and/or concurrency mode controller 108) may determine to switch to an independent mode when a condition on the wireless communication device 102 indicates a trigger, instruction, etc., to discontinue communication with an additional service. For instance, the wireless communication device 102 (e.g., processor 110 and/or concurrency mode controller 108) may determine a switch to independent mode when an additional SIM card is removed from the wireless communication device 102, when an additional SIM is deactivated, and/or when the additional service enters an idle mode. Examples of switch determination to enter an independent mode are given below.

In some examples, the transceiver 106 may be configured to send a communication capability signal to a base station 112 in response to the switch. The communication capability signal may indicate a resource communication capability adjustment for a first service. In some examples, the processor 110 (e.g., concurrency mode controller 108) may generate the communication capability signal and/or provide the communication capability signal to the transceiver 106 for transmission to the base station 112.

In some approaches, the wireless communication device 102 (e.g., processor 110, concurrency mode controller 108, and/or transceiver 106) may initially advertise maximum communication capabilities to the network (e.g., base station 112). For example, regardless of concurrency mode of operation with another service, an LTE capable service may advertise, to the network, maximum communication (e.g., receive and/or transmit) capabilities with respect to MIMO (e.g., number of layers, antennas, etc.) and/or number of carriers that the wireless communication device 102 can support (if sufficient baseband and/or RF resources are available, for instance). The network (e.g., base station 112) may initially configure communications (e.g., service, link(s), carrier(s), layer(s), slot(s), etc.) in the wireless communication device 102 based on the advertised capabilities. For instance, the base station 112 may send one or more configuration messages to the wireless communication device 102. The wireless communication device 102 (e.g., processor 110, concurrency mode controller 108, and/or transceiver 106) may communicate with the network (e.g., base station 112) based on the configuration for the service.

In some examples, when the wireless communication device 102 (e.g., processor 110, concurrency mode controller 108, and/or transceiver 106) that is communicating with a first service (e.g., with a subscription that has an active connection with the network) enters a concurrency mode (with the activation and/or setup of a dedicated channel on a second service), there may one or more resources (e.g., baseband and/or RF resources) to be freed up for communication with the second service. The loss of one or more resources (e.g., baseband and/or RF resources) may affect the number of receive paths, MIMO layers (e.g., receive layers), and/or number of carriers that can be supported on the first service. To allow for concurrent operation, the wireless communication device 102 (e.g., processor 110 and/or concurrency mode controller 108) may reduce (e.g., downgrade, throttle, etc.) one or more capabilities for the first service. In some approaches, the wireless communication device 102 (e.g., processor 110 and/or concurrency mode controller 108) may inform the network (e.g., base station 112) to reduce and/or avoid throughput errors (e.g., increased block error rate (BLER)) and poor performance on the service. In some examples, the wireless communication device 102 may utilize one or more approaches to inform the network (e.g., base station 112) of a resource communication capability adjustment for a service.

In some approaches, channel information (e.g., channel state information (CSI), channel report(s), etc.) may be an example of the communication capability signal. For instance, the wireless communication device 102 (e.g., processor 110, concurrency mode controller 108, and/or transceiver 106) may send channel information to the base station 112 that indicates a resource communication capability for one or more services.

Examples of channel information may include one or more channel quality indicators (CQIs) and/or one or more rank indicators (RIs). In some approaches, the network (e.g., base station 112) may configure the RI reporting periodicity for the wireless communication device 102 during an attach procedure (e.g., initial registration, attachment, etc.). In some examples, the wireless communication device 102 may use the RI reporting and/or CQI reporting to inform the network (e.g., base station 112) that one or more carriers of a service are inoperable and/or inform the network of a loss of reception that impacts MIMO capabilities.

In some examples, the communication capability signal is a CQI corresponding to a first service. The CQI may indicate that one or more carriers allocated to the first service is or are inoperable. In some examples, the CQI may be a discrete value between 0 and 15. For instance, a value 0 may indicate that the wireless communication device 102 has not received any usable signals (e.g., LTE signals) and/or that a corresponding carrier (e.g., channel) is inoperable. This approach may be used by the wireless communication device 102 when dropping a carrier, for instance. In some cases, the one or more carriers may be actually usable, but the CQI(s) may indicate that the one or more carriers are inoperable, which may allow the carrier(s) to be freed for use by a second service. For instance, the CQI(s) may indicate one or more values that do not correspond to actual channel measurement(s).

Upon receiving the CQI indicating that the one or more carriers are inoperable, for example, the base station 112 may discontinue sending signaling for the wireless communication device 102 on the one or more carriers and/or may reconfigure the wireless communication device 102 to communicate without the one or more carriers indicated. For instance, upon receiving the CQI report(s) from the wireless communication device 102, the network (e.g., base station 112) may change the transmission layer in the downlink data transmission (e.g., receive layer) and/or reduce the physical downlink shared channel (PDSCH) rank for the wireless communication device 102. In some examples, the base station 112 may update a rank reporting and/or a CQI reporting (for reporting to the network) for a service based on one or more network configurations when the concurrency mode changes.

In some examples, the processor 110 (e.g., concurrency mode controller 108) may drop the carrier for the first service and/or adjust a setting to communicate with a second service on the one or more carriers. For instance, the processor 110 (e.g., concurrency mode controller 108) may adjust data formatting, mapping, coding, power amplifier tuning, and/or filtering to discontinue using the one or more carriers for the first service. In some examples, the processor 110 (e.g., concurrency mode controller 108) may adjust data formatting, mapping, coding, power amplifier tuning, and/or filtering to use resource(s) corresponding to the one or more carriers for communication on the second service.

In some examples, the communication capability signal is an RI corresponding to a first service. The RI may indicate that one or more layers allocated to the first service is or are inoperable. In some cases, the one or more layers may be actually usable, but the RI(s) may indicate that the one or more layers are inoperable, which may allow one or more resources to be freed for use by a second service. For instance, the RI(s) may indicate one or more values that do not correspond to actual measurement(s).

Upon receiving the RI indicating that the one or more layers are inoperable, for example, the base station 112 may discontinue sending signaling for the wireless communication device 102 on the one or more layers and/or may reconfigure the wireless communication device 102 to communicate without the one or more layers indicated. For instance, upon receiving the RI report(s) from the wireless communication device 102, the network (e.g., base station 112) may change the layer in the downlink data transmission and/or reduce the PDSCH rank for the wireless communication device 102. In some examples, the base station 112 may update a rank reporting and/or a CQI reporting (for reporting to the network) for a service based on one or more network configurations when the concurrency mode changes.

In some examples, the processor 110 (e.g., concurrency mode controller 108) may adjust a setting to communicate with a second service using one or more released resources. For instance, the processor 110 may adjust one or more settings to communicate with a second service using a stream or layer released based on the rank reporting or RI (e.g., a stream or layer released by the network in response to the RI). In some examples, the wireless communication device 102 may provide rank reporting (e.g., RI) to the network (e.g., base station 112). For instance, when the wireless communication device 102 reports a rank of 1, the network (e.g., base station 112) may start sending data in a transmit diversity mode. In some examples, the wireless communication device 102 may not reduce throughput as no parallel data streams may be used with transmit diversity. The stream(s) and/or layer(s) released may be used for another concurrent service (e.g., the second service). For instance, the processor 110 (e.g., concurrency mode controller 108) may adjust data formatting, mapping, coding, power amplifier tuning, antenna port switching, precoding, channel equalization, and/or filtering to discontinue using the one or more streams and/or layers for the first service. In some examples, the processor 110 (e.g., concurrency mode controller 108) may adjust data formatting, mapping, coding, power amplifier tuning, antenna port switching, precoding, channel equalization, and/or filtering to use resource(s) corresponding to the one or more layers for communication on the second service. In some examples, the wireless communication device 102 (e.g., processor 110 and/or concurrency mode controller 108) may send a rank report (e.g., RI) indicating an increased rank after communications with the second service are finished and/or when the second service transitions to idle. For instance, the wireless communication device 102 (e.g., UE) may send a rank report that increases the rank to 2. In response, the network (e.g., base station 112) may start sending data in MIMO mode on the downlink. Some of the techniques described herein that utilize channel information (e.g., CQI and/or RI) for communication capability signaling may be beneficial, as capabilities and/or resources may be adjusted without severing a link between the wireless communication device and network.

In some approaches, the transceiver 106 may be configured to send a detach signal to the base station 112 in response to the switch. For example, the processor 110 may generate and/or provide a detach signal to the transceiver 106 for transmission to the base station 112. A detach signal may indicate that the wireless communication device 102 will detach (e.g., disconnect, discontinue communication, etc.). In some examples, the communication capability signal is an attachment capability signal that indicates an adjusted resource capability (e.g., a second resource capability that is different from a first resource capability used before sending the detach signal). For instance, when a switch is determined, the wireless communication device 102 (e.g., processor 110, concurrency mode controller 108, and/or transceiver 106) may detach from the base station 112 and re-attach with a different capability negotiation. Accordingly, a capability exchange procedure may be triggered with the network (e.g., base station 112) through a detach and attach procedure. For instance, a capability exchange procedure may be triggered for a service for a concurrency mode switch that uses a capability adjustment.

In some approaches, the transceiver 106 may be configured to send a tracking area update signal to the base station 112 in response to the switch. For example, the processor 110 may generate and/or provide a tracking area update signal to the transceiver 106 for transmission to the base station 112. A tracking area update signal may indicate a trigger for a capability update and/or exchange for the wireless communication device 102. For instance, a tracking area update signal with a radio capability update flag set may indicate to the network (e.g., base station 112) that a radio capability update and/or exchange is requested and/or triggered. In some examples, if the network (e.g., base station 12) does not respond for a threshold period of time, the wireless communication device 102 (e.g., UE) may detach (e.g., disconnect, discontinue communication, etc.), while the tracking area update signal may indicate to the network that a capability exchange is requested and/or triggered. Accordingly, a capability exchange procedure may be triggered with the network (e.g., base station 112) through a tracking area update procedure. For instance, a capability exchange procedure may be triggered for a service for a concurrency mode switch that uses a capability adjustment.

Some examples of concurrency mode switching scenarios (e.g., examples of switch determination and/or capability management) are given as follows. For instance, a concurrency mode switch may be between single SIM and single SIM concurrent with C-V2X, may be between 5G and 5G concurrent with 4G DSDA, may be between 5G and 5G concurrent with 5G DSDA, or may be between 5G and 5G concurrent with 4G DSDA and C-V2X.

Some of the techniques described herein may perform dynamic capability management for concurrency mode switching. In some examples, the wireless communication device 102 may perform resource throttling (e.g., signal to increase or decrease resources for one or more services) in accordance with one or more of the following scenarios. SIM and C-V2X: the wireless communication device 102 (e.g., processor 110 and/or concurrency mode controller 108) may throttle down when C-V2X is transitioning to connected, and/or may throttle back up when C-V2X is in idle.

5G and 4G DSDA: in some examples, the wireless communication device 102 (e.g., processor 110 and/or concurrency mode controller 108) may throttle up when only one SIM is inserted. The wireless communication device 102 (e.g., processor 110 and/or concurrency mode controller 108) may throttle down when two SIMs are inserted and based on the second SIM becoming active and/or may throttle back up when the second SIM is idle. This case may utilize a SIM to SIM exchange of states. The wireless communication device 102 (e.g., processor 110 and/or concurrency mode controller 108) may throttle up when a high capability subscription is on LTE standalone or legacy technologies based on 5G or legacy coverage in the tracking area. A high or higher capability subscription may be a subscription that is capable of supporting a higher modem envelope and/or higher throughput than a low or lower capability subscription. In some examples, a high capability subscription may be capable of higher throughput with support for a greater number of carriers and/or a greater number of MIMO layers than a low or lower capability subscription. In some examples, a high capability subscription may have the capability to support more standalone technologies relative to a low capability subscription (e.g., may support 5G, NR, LTE, WCDMA, and/or GSM, etc.).

5G and 5G DSDA: the wireless communication device 102 (e.g., processor 110 and/or concurrency mode controller 108) may utilize similar techniques as those described in relation to the 5G and 4G DSDA case. The wireless communication device 102 (e.g., processor 110 and/or concurrency mode controller 108) may throttle up when a lower capability subscription is on LTE standalone or legacy technologies based on 5G or legacy coverage in the tracking area. A low or lower capability subscription may be a subscription that has a relatively lower throughput capability in comparison to the higher capability subscription. In some examples, a low capability subscription may provide lower throughput relative to a high capability subscription due to a reduced number of carriers (e.g., CA) and/or MIMO layer support. In some examples, a low capability subscription may not support as many standalone technologies as a high capability subscription (e.g., may not support NR, 5G, and/or WCDMA, etc.).

5G and 4G DSDA and C-V2X: the wireless communication device 102 (e.g., processor 110 and/or concurrency mode controller 108) may utilize similar techniques as those described in relation to the 5G and 4G DSDA case. The wireless communication device 102 (e.g., processor 110 and/or concurrency mode controller 108) may throttle down when C-V2X is transitioning to connected and/or may throttle back up when in C-V2X is in idle. The wireless communication device 102 (e.g., processor 110 and/or concurrency mode controller 108) may throttle down in Voice+Voice scenarios.

5G and 4G DSDA and C-V2X: the wireless communication device 102 (e.g., processor 110 and/or concurrency mode controller 108) may utilize similar techniques as those described in relation to the 5G and 5G DSDA case. The wireless communication device 102 (e.g., processor 110 and/or concurrency mode controller 108) may throttle down when C-V2X is transitioning to connected and/or may throttle back up when in idle. The wireless communication device 102 (e.g., processor 110 and/or concurrency mode controller 108) may throttle down in Voice+Voice scenarios.

In some examples, additional or alternative triggers for dynamic capability management for concurrency mode switching. For instance, based on observation for a period (e.g., a relatively long observation, over 2 hours, 10 hours, a day, a week, a number configurations with the subscriptions, 4 configurations, 10 configurations, etc.) of network configuration on two subscriptions, the wireless communication device 102 (e.g., processor 110 and/or concurrency mode controller 108) may adjust one or more resources to increase (e.g., maximize) the data performance (e.g., throughput). For example, if the network (e.g., base station 112) serving a first service tends to configure more LTE layers than the network (e.g., another base station) serving a second service, more resources for LTE may be assigned to the first service. For instance, the adjustment may be performed to match or approximate (e.g., allocate within a range from) an observed amount of resources historically assigned.

In some examples, the one or more resources may be adjusted based on network (e.g., base station 112) coverage. For instance, if a first service has only 3G and/or 2G service, a second service may use most or all modem resources for LTE and NR.

In some examples, the one or more resources may be adjusted based on a usage pattern. For instance, if a user of a first service is a relatively light data user, over a period, more resources may be assigned to a second service.

In some examples of the techniques described herein, a service may be able to support an increased capability (e.g., maximum allowed capability) in a given mode regardless of a concurrency change that may occur at any point. In some examples, the wireless communication device 102 may behave similar to a single-SIM device (e.g., phone) in the absence of concurrency with another service. When operating in concurrency mode, the wireless communication device 102 (e.g., processor 110 and/or concurrency mode controller 108) may adjust one or more capabilities internally to support increased (e.g., maximum possible) MIMO, reception, and/or carriers and remain in sync with the network (e.g., base station 112).

Figure 2:
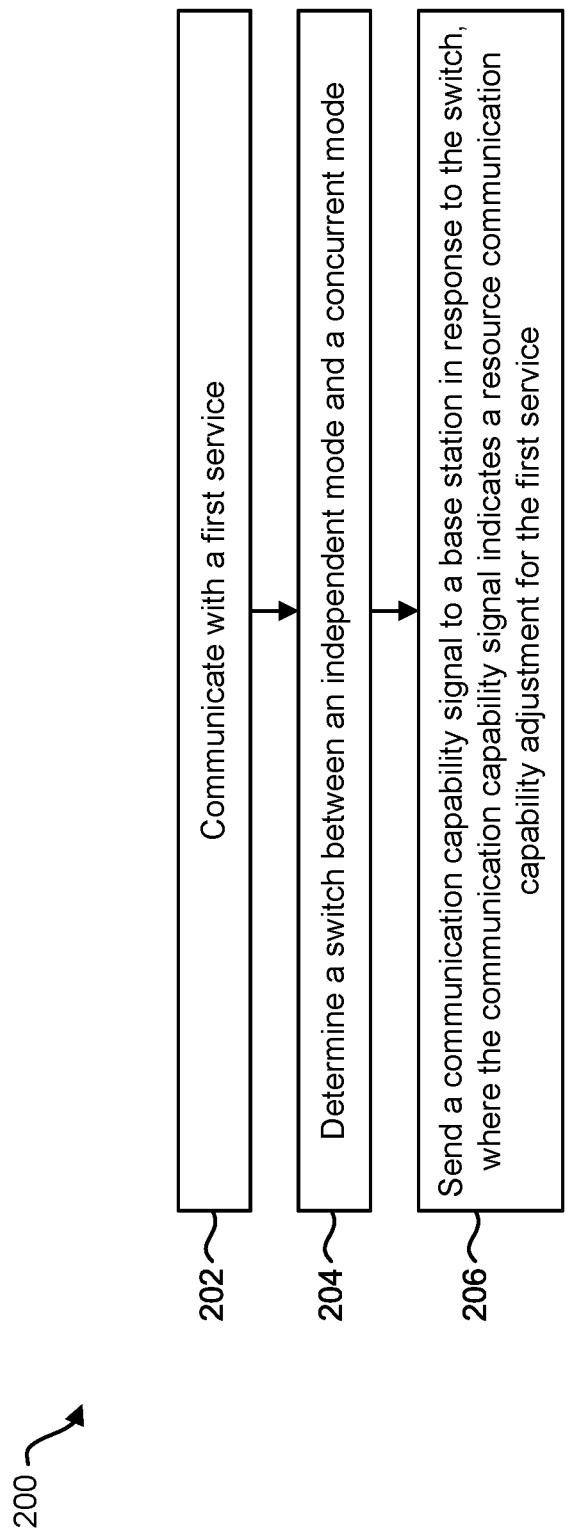
FIG. 2 is a flow diagram illustrating an example of a method for capability management for concurrency mode control.

FIG. 2 is a flow diagram illustrating an example of a method 200 for capability management for concurrency mode control. In some examples, the method 200 is performed by a wireless communication device (e.g., the wireless communication device 102 described in relation to FIG. 1).

A wireless communication device may communicate 202 with a first service. For example, the wireless communication device may communicate with a network (e.g., base station) using a first service.

The wireless communication device may determine 204 a switch between an independent mode and a concurrency mode. In some examples, determining 204 the switch may be performed as described in relation to FIG. 1.

The wireless communication device may send 206 a communication capability signal to a base station in response to the switch. The communication capability signal may indicate a resource communication capability adjustment (e.g., throttling up or down resources) for the first service. In some examples, sending 206 the communication capability signal may be performed as described in relation to FIG. 1.

Figure 3:
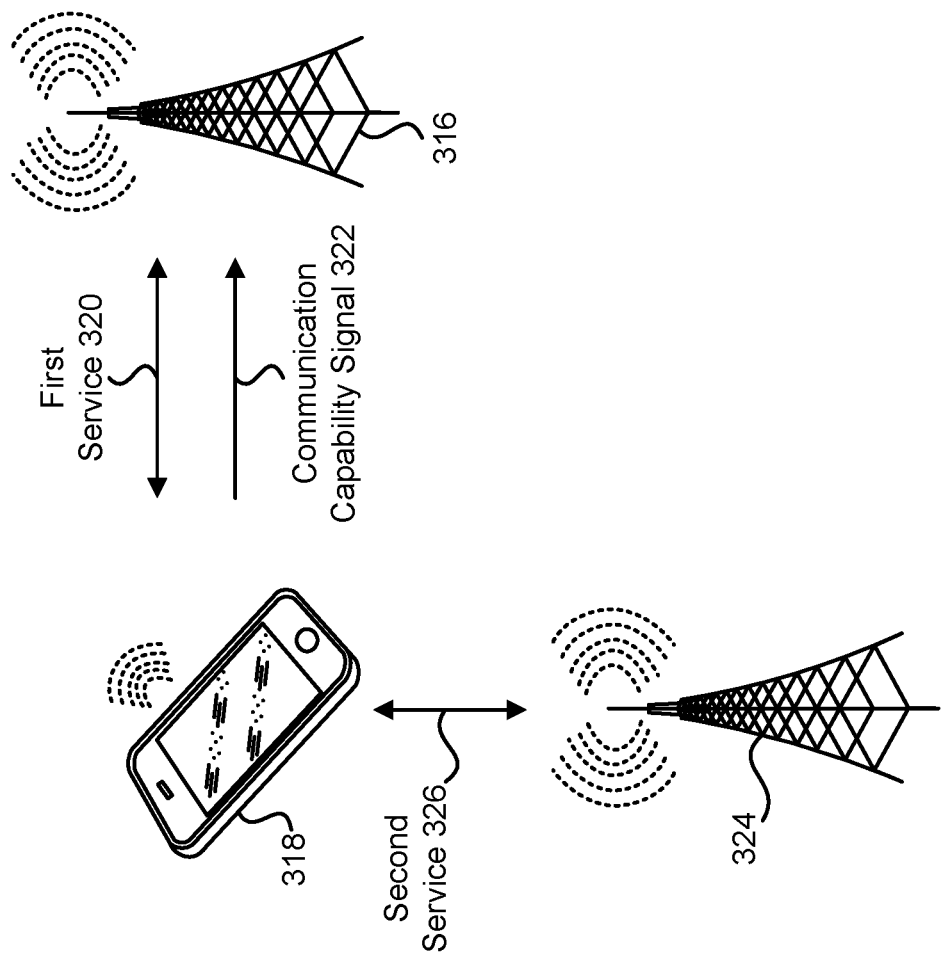
FIG. 3 is a diagram illustrating an example of a smartphone in which examples of capability management for concurrency mode may be implemented.

FIG. 3 is a diagram illustrating an example of a smartphone 318 in which examples of capability management for concurrency mode may be implemented. The smartphone 318 may be an example of the wireless communication device 102 described in relation to FIG. 1. A first base station 316 is also illustrated in FIG. 3. The first base station 316 may be a RAN or may be included in a RAN. The first base station 316 may be an example of the base station 112 described in relation to FIG. 1. A second base station 324 is also illustrated. In this example, the smartphone 318 communicates with the first base station 316 using a first service 320. For instance, the smartphone 318 may utilize the first service 320 to communicate with the first base station 316 in an independent mode. In some examples, the first service 320 may use maximum advertised resources (e.g., 7 downlink carriers and 24 layers).

The smartphone 318 may determine a switch to a concurrency mode. For instance, a trigger may occur to switch the smartphone 318 to a concurrency mode, where the smartphone communicates with the first service 320 and a second service 326 concurrently. In this example, the smartphone 318 may send a communication capability signal 322 to the first base station. For instance, the smartphone 318 may send a CQI indicating that 3 downlink carriers are inoperable and/or may send an RI indicating that 8 layers are inoperable. The first base station 316 may respond to the communication capability signal 322 (e.g., CQI and/or RI) by reconfiguring resources for the first service 320. For instance, the first base station 316 may reconfigure the smartphone 318 to utilize 4 downlink carriers and/or 16 layers for the first service. The smartphone 318 may utilize the dropped resources to communicate with the second base station 324 with the second service 326.

In some examples, the second service 326 may transition to idle (e.g., may stop using resources for communication). The smartphone 318 may determine a switch from the concurrency mode to an independent mode. The smartphone 318 may send another communication capability signal 322 (e.g., CQI indicating that 7 downlink carriers and/or 24 layers are operable). The first base station 316 may reconfigure resources to allow the smartphone 318 to communicate using 7 downlink carriers and 24 layers with the first service 320.

Figure 4:
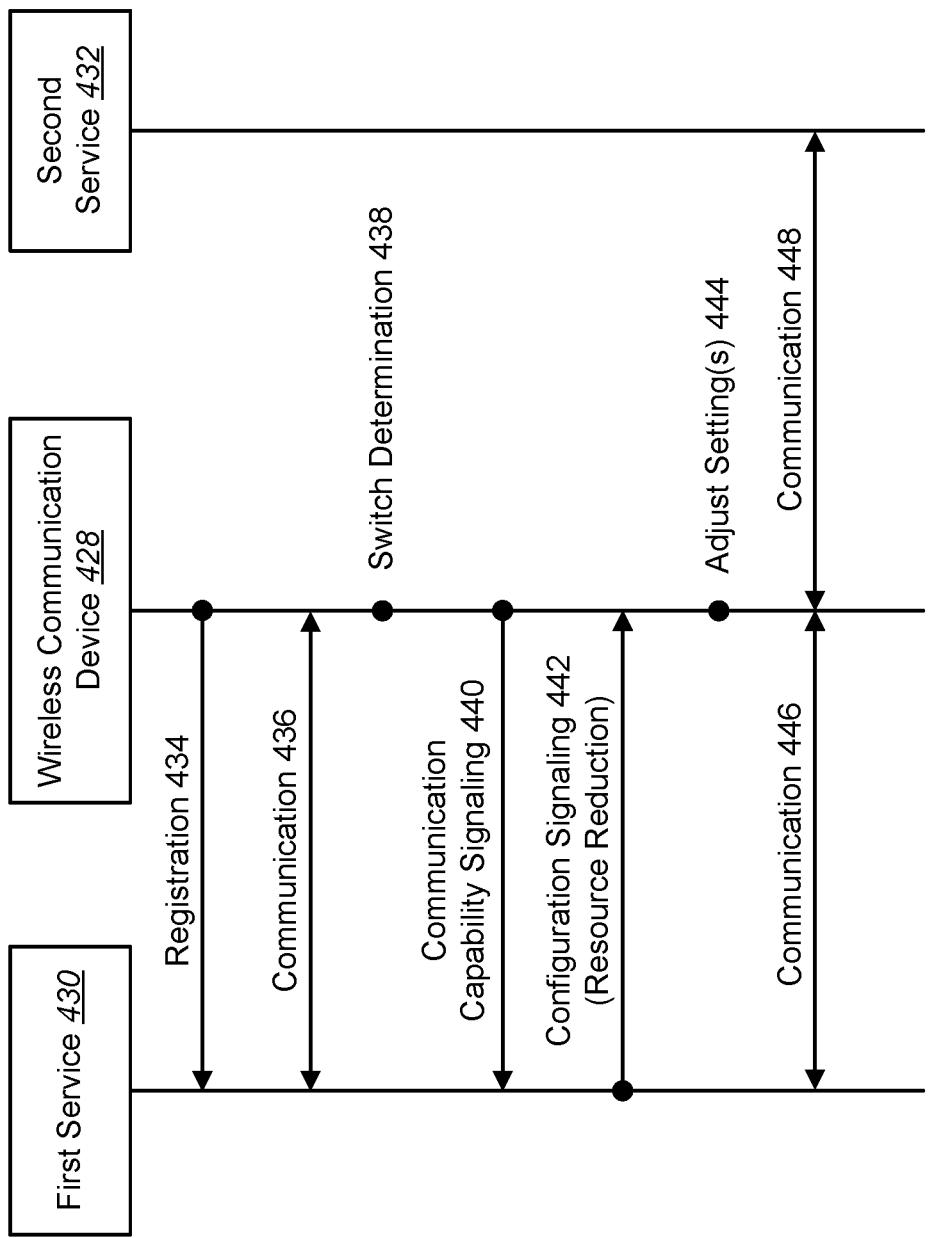
FIG. 4 is a thread diagram illustrating an example of switching from an independent mode to a concurrency mode.

FIG. 4 is a thread diagram illustrating an example of switching from an independent mode to a concurrency mode. FIG. 4 illustrates a wireless communication device 428. The wireless communication device 428 may be an example of the wireless communication device 102 described in relation to FIG. 1. FIG. 4 also illustrates a first service 430 and a second service 432. The first service 430 and the second service 432 may be provided by a same network (e.g., base station) or different networks (e.g., base stations).

In this example, the wireless communication device 428 performs registration 434 with the first service 430. During registration, the wireless communication device 428 may advertise wireless communication device 428 capabilities (e.g., maximum number of carriers for carrier aggregation and/or maximum number of layers for MIMO). The wireless communication device 428 may communicate 436 with the first service 430 based on the registration 434.

In this example, the wireless communication device 428 determines 438 a switch. For instance, the wireless communication device 428 may determine to switch from independent mode (with just the first service 430) to a concurrency mode with the first service 430 and a second service 432. In response to the switch determination 438, the wireless communication device 428 may send communication capability signaling 440 to the first service 430. For instance, the communication capability signaling 440 may indicate that one or more resources being used for the communication 436 is inoperable. The wireless communication device 428 may receive configuration signaling 442 that reduces the resources (e.g., carriers, layers, streams, paths, and/or slots, etc.) used for the first service 430. The wireless communication device 428 may adjust one or more settings 444 (e.g., formatting, mapping, coding, channel equalization, power amplifier tuning, filtering, and/or antenna port switching, etc.). The wireless communication device 428 may communicate 446 with the first service 430 and may communicate 448 with the second service 432 concurrently. For instance, the communication 446 with the first service 430 may utilize the reduced resources. The communication 448 with the second service 432 may utilize one or more resources that were freed due to the resource reduction with the first service 430.

Figure 5:
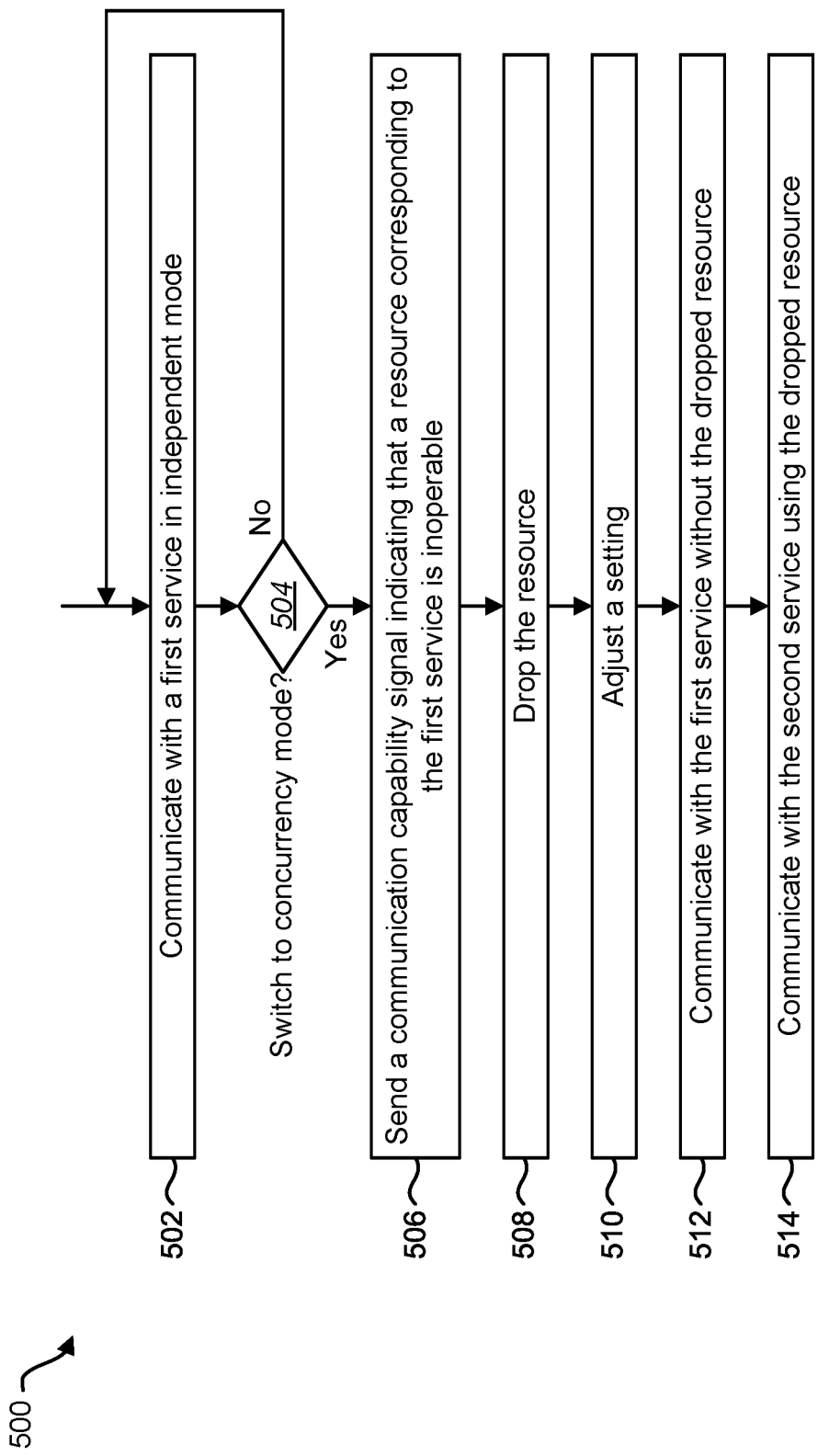
FIG. 5 is a flow diagram illustrating an example of a method for capability management for concurrency mode control.

FIG. 5 is a flow diagram illustrating an example of a method 500 for capability management for concurrency mode control. In some examples, the method 500 is performed by a wireless communication device (e.g., the wireless communication device 102 described in relation to FIG. 1). In some examples, one or more of the functions, procedures, operations, etc., described in relation to FIG. 5 may be combined with one or more of the functions, procedures, operations, methods, etc. described herein.

A wireless communication device may communicate 502 with a first service in independent mode. In some examples, communicating 502 with the first service may be performed as described in relation to FIG. 1. For example, the wireless communication device may communicate with one network and/or base station with a first service.

The wireless communication device may determine 504 whether to switch to concurrency mode. In some examples, determining 504 whether to switch to concurrency mode may be performed as described in relation to FIG. 1. In a case it is determined not to switch to concurrency mode, the wireless communication device may continue to communicate 502 with the first service in independent mode.

In a case it is determined to switch to concurrency mode, the wireless communication device may send 506 a communication capability signal indicating that a resource corresponding to the first service is inoperable. In some examples, sending 506 the communication capability signal may be performed as described in relation to FIG. 1. In some examples, the wireless communication device may determine an amount of resources expected for a second service. For instance, the wireless communication device may read a default amount from memory and/or may calculate an expected amount of resources based on past communication with the second service. In some examples, the communication capability signal may indicate that one or more resources are inoperable in the amount of resources for the second service. In some examples, the communication capability signal may be a channel information signal. In some examples, the communication capability signal may be an attachment capability signal after sending a detach signal.

The wireless communication device may drop 508 the one or more resources (e.g., carrier(s) and/or layer(s)). In some examples, dropping 508 the resource(s) may be performed as described in relation to FIG. 1. For example, the wireless communication device may discontinue using the resources for the first service and/or may receive configuration signaling to discontinue using the resources for the first service.

The wireless communication device may adjust 510 one or more settings. In some examples, adjusting 510 the one or more settings may be performed as described in relation to FIG. 1. For instance, the wireless communication device may adjust data formatting, mapping, coding, power amplifier tuning, antenna port switching and/or filtering.

The wireless communication device may communicate 512 with the first service without the dropped resource(s). For instance, the wireless communication device may communicate (e.g., continue to communicate or resume communicating) with the first service using one or more resources remaining after throttling down the resources for the first service.

The wireless communication device may communicate 514 with the second service using the dropped resource(s). For instance, the wireless communication device may communicate (e.g., begin communicating) with the second service using one or more resources that were dropped after throttling down the resources for the first service.

Figure 6:
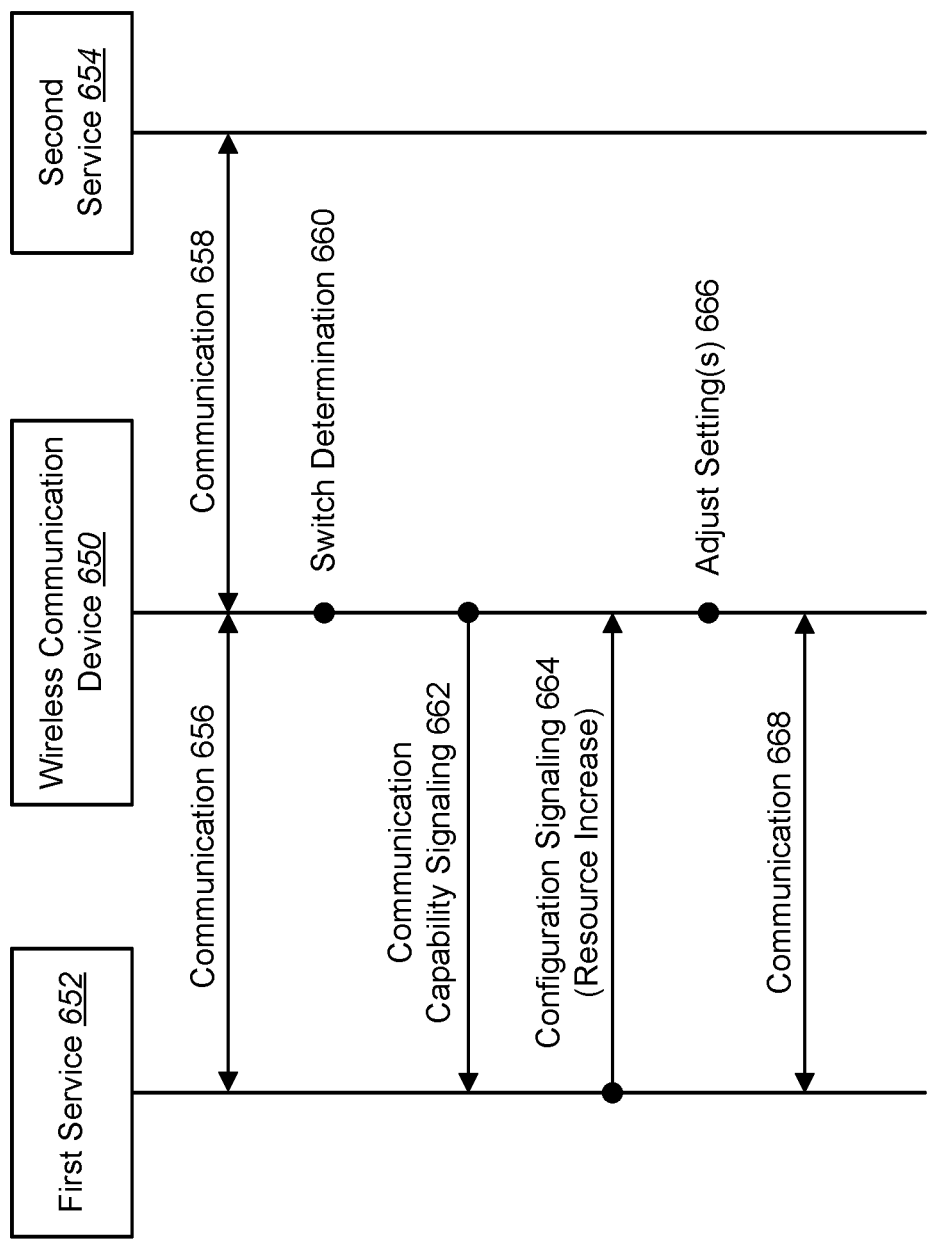
FIG. 6 is a thread diagram illustrating an example of switching from a concurrency mode to an independent mode.

FIG. 6 is a thread diagram illustrating an example of switching from a concurrency mode to an independent mode. FIG. 6 illustrates a wireless communication device 650. The wireless communication device 650 may be an example of the wireless communication device 102 described in relation to FIG. 1. FIG. 6 also illustrates a first service 652 and a second service 654. The first service 652 and the second service 654 may be provided by a same network (e.g., base station) or different networks (e.g., base stations).

In this example, the wireless communication device 650 may communicate 656 with the first service 652 and may communicate 658 with the second service 654 concurrently. For instance, the communication 656 with the first service 652 may utilize first resources and the communication 658 with the second service 654 may utilize second resources.

In this example, the wireless communication device 650 determines 660 a switch. For instance, the wireless communication device 650 may determine to switch from concurrency mode with the first service 652 and a second service 654 to an independent mode (with just the first service 652). In response to the switch determination 660, the wireless communication device 650 may send communication capability signaling 662 to the first service 652. For instance, the communication capability signaling 662 may indicate that the second resources that were used for communication with the second service 654 are operable. The wireless communication device 650 may receive configuration signaling 664 that increases the resources (e.g., carriers and/or layers) used for the first service 652. The wireless communication device 650 may adjust one or more settings 666 (e.g., formatting, mapping, coding, power amplifier tuning, filtering, antenna port switching, etc.). The resulting communication 668 with the first service 652 may utilize one or more of the second resources that were freed due to reducing (e.g., stopping) communication with the second service 654.

Figure 7:
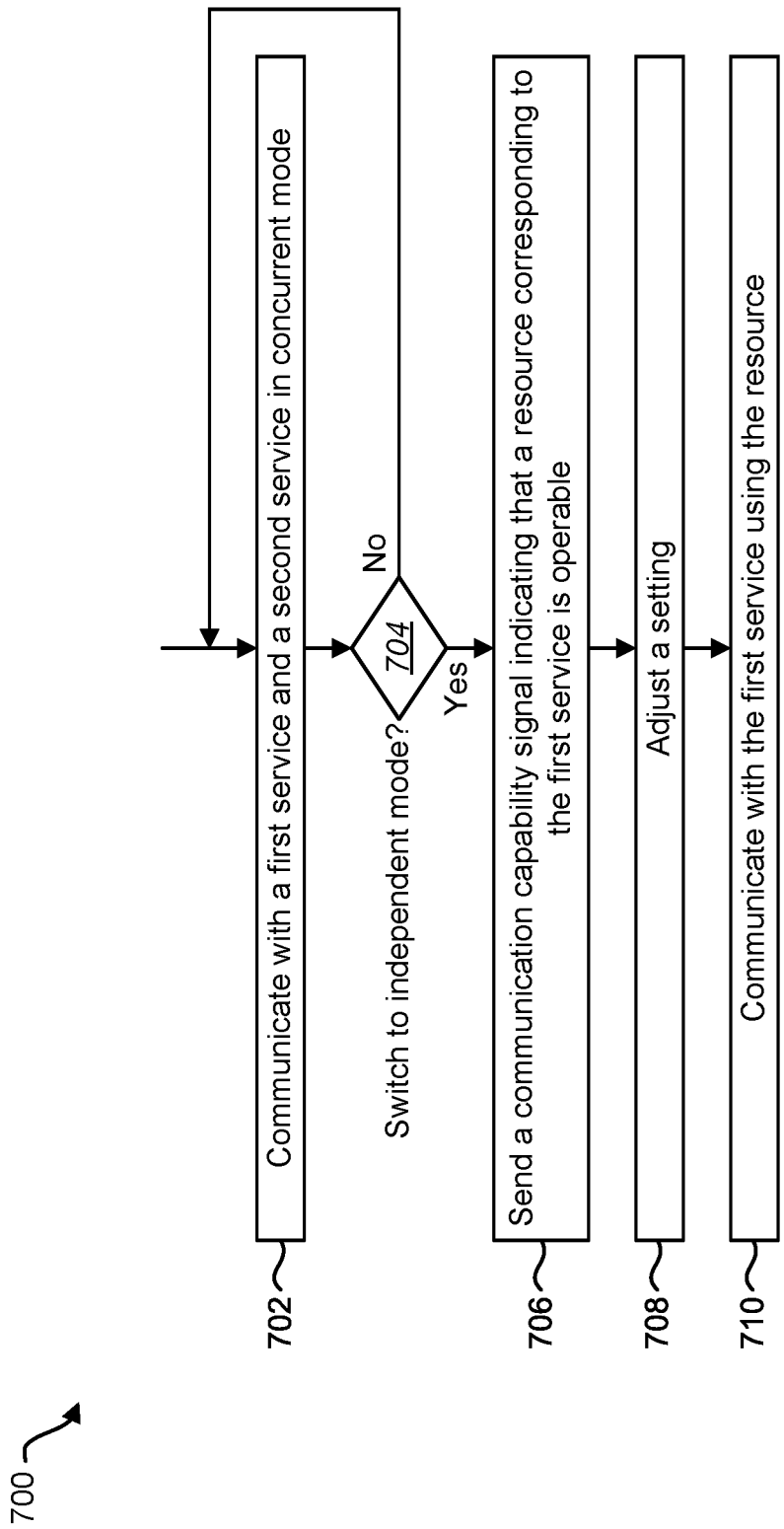
FIG. 7 is a flow diagram illustrating another example of a method for capability management for concurrency mode control.

FIG. 7 is a flow diagram illustrating another example of a method 700 for capability management for concurrency mode control. In some examples, the method 700 is performed by a wireless communication device (e.g., the wireless communication device 102 described in relation to FIG. 1). In some examples, one or more of the functions, procedures, operations, etc., described in relation to FIG. 7 may be combined with one or more of the functions, procedures, operations, methods, etc. described herein.

A wireless communication device may communicate 702 with a first service and a second service in concurrent mode. In some examples, communicating 702 with the first service may be performed as described in relation to FIG. 1. For example, the wireless communication device may communicate with one network and/or base station with a first service and may concurrently communicate with the same or a different network and/or base station with a second service.

The wireless communication device may determine 704 whether to switch to independent mode. In some examples, determining 704 whether to switch to independent mode may be performed as described in relation to FIG. 1. In a case it is determined not to switch to independent mode, the wireless communication device may continue to communicate 702 with the first service and the second service in concurrency mode.

In a case it is determined to switch to independent mode, the wireless communication device may send 706 a communication capability signal indicating that a resource corresponding to the first service is operable. In some examples, sending 706 the communication capability signal may be performed as described in relation to FIG. 1. In some examples, the communication capability signal may indicate that all resources corresponding to wireless communication device capability are operable (e.g., maximum carriers and/or layers) for the first service. In some examples, the communication capability signal may be a channel information signal. In some examples, the communication capability signal may be an attachment capability signal after sending a detach signal. In some examples, the wireless communication device may drop and/or discontinue using one or more resources that were being used for communication with the second service.

The wireless communication device may adjust 708 one or more settings. In some examples, adjusting 708 the one or more settings may be performed as described in relation to FIG. 1. For instance, the wireless communication device may adjust data formatting, mapping, coding, power amplifier tuning, antenna port switching and/or filtering.

The wireless communication device may communicate 710 with the first service using the one or more resources. For instance, the wireless communication device may communicate with the first service using one or more resources that were indicated as operable after throttling up the resources for the first service.

Figure 8:
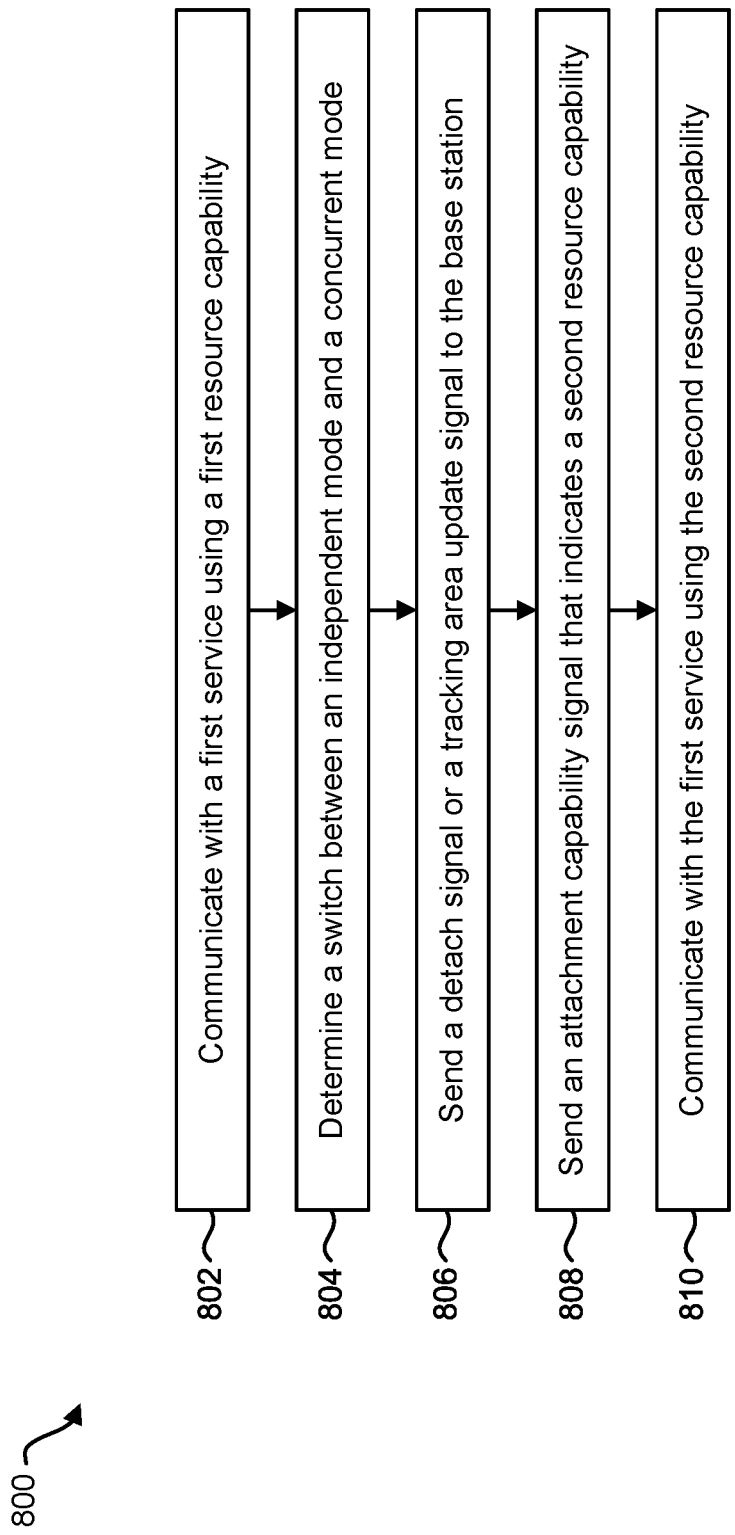
FIG. 8 is a flow diagram illustrating another example of a method for capability management for concurrency mode control.

FIG. 8 is a flow diagram illustrating another example of a method 800 for capability management for concurrency mode control. In some examples, the method 800 is performed by a wireless communication device (e.g., the wireless communication device 102 described in relation to FIG. 1). In some examples, one or more of the functions, procedures, operations, etc., described in relation to FIG. 8 may be combined with one or more of the functions, procedures, operations, methods, etc. described herein.

A wireless communication device may communicate 802 with a first service using a first resource capability. In some examples, communicating 802 with the first service using the first resource capability may be performed as described in relation to FIG. 1 and/or FIG. 2.

The wireless communication device may determine 804 a switch between an independent mode and a concurrent mode. In some examples, determining 804 the switch may be performed as described in relation to one or more of FIGS. 1-2.

The wireless communication device may send 806 a detach signal or a tracking area update signal to the base station. In some examples, sending 806 the detach signal or tracking area update signal may be performed as described in relation to FIG. 1.

The wireless communication device may send 808 an attachment capability signal that indicates a second resource capability. In some examples, sending 808 the attachment capability signal may be performed as described in relation to FIG. 1. For example, the wireless communication device may send an attachment capability signal during an attachment procedure, where the attachment capability signal indicates a second resource capability that is different from a first resource capability used before sending 806 the detach signal. For instance, the second resource capability may be a number or numbers of resources (e.g., a number of carriers and/or layers) for a service that is or are greater or less than a number or numbers of resources that were used to communicate with the service before sending the detach signal.

The wireless communication device may communicate 810 with the first service using the second resource capability. In some examples, communicating 810 with the first service using the second resource capability may be performed as described in relation to FIG. 1. For instance, the wireless communication device may communicate with the first service using increased or reduced resources (e.g., after throttling up or throttling down).

Figure 9:
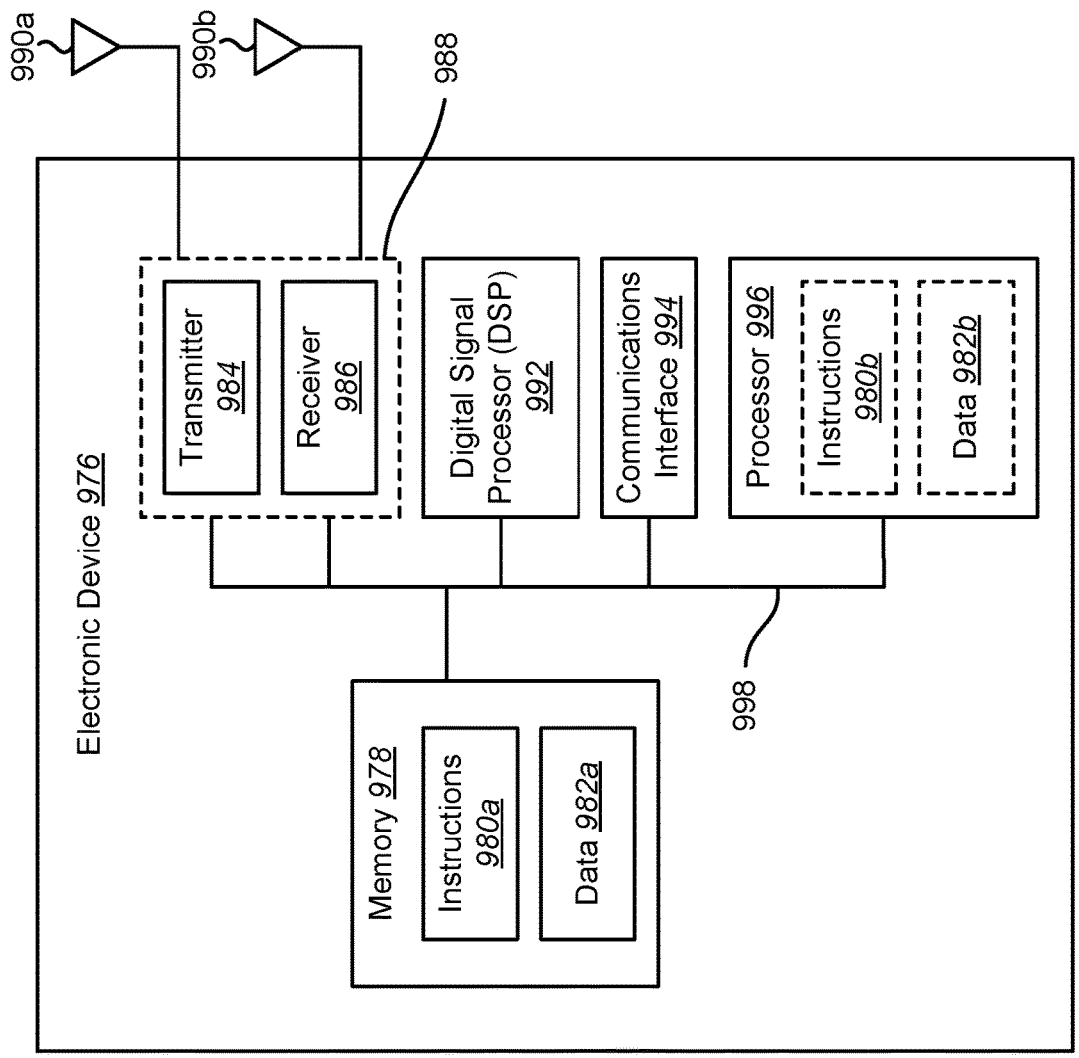
FIG. 9 illustrates certain components that may be included within an electronic device configured to implement various examples of the systems and methods disclosed herein for capability management for concurrent mode control.

FIG. 9 illustrates certain components that may be included within an electronic device 976 configured to implement various examples of the systems and methods disclosed herein for capability management for concurrent mode control. The electronic device 976 may be an access terminal, a mobile station, a user equipment (UE), a smartphone, a digital camera, a video camera, a tablet device, a laptop computer, a desktop computer, an Internet of Things (IoT) device, a telematics device, a base station, an access point, a vehicle, a drone, etc. The electronic device 976 may be implemented in accordance with one or more of the wireless communication devices (e.g., wireless communication device 102) described herein.

The electronic device 976 includes a processor 996. The processor 996 may be a general purpose single- or multi-chip microprocessor (e.g., an ARM), a special purpose microprocessor (e.g., a digital signal processor (DSP)), a microcontroller, a programmable gate array, etc. The processor 996 may be referred to as a central processing unit (CPU) and/or a modem processor. Although a single processor 996 is shown in the electronic device 976, in an alternative configuration, a combination of processors (e.g., an ARM and DSP) could be implemented.

The electronic device 976 also includes memory 978. The memory 978 may be any electronic component capable of storing electronic information. The memory 978 may be embodied as random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), synchronous dynamic random-access memory (SDRAM), registers, and so forth, including combinations thereof.

Data 982a and instructions 980a may be stored in the memory 978. The instructions 980a may be executable by the processor 996 to implement one or more of the methods described herein. Executing the instructions 980a may involve the use of the data 982a that is stored in the memory 978. When the processor 996 executes the instructions 980, various portions of the instructions 980b may be loaded onto the processor 996 and/or various pieces of data 982b may be loaded onto the processor 996. In some examples, the instructions 980 may be executable to implement and/or perform one or more of the methods 200, 500, 700, 800, and/or one or more of the functions, procedures, and/or operations described herein.

The electronic device 976 may also include a transmitter 984 and a receiver 986 to allow transmission and reception of signals to and from the electronic device 976. The transmitter 984 and receiver 986 may be collectively referred to as a transceiver 988. One or more antennas 990a-b may be electrically coupled to the transceiver 988. The electronic device 976 may also include (not shown) multiple transmitters, multiple receivers, multiple transceivers, and/or additional antennas.

The electronic device 976 may include a digital signal processor (DSP) 992. The electronic device 976 may also include a communications interface 994. The communications interface 994 may allow and/or enable one or more kinds of input and/or output. For example, the communications interface 994 may include one or more ports and/or communication devices for linking other devices to the electronic device 976. In some examples, the communications interface 994 may include the transmitter 984, the receiver 986, or both (e.g., the transceiver 988). Additionally or alternatively, the communications interface 994 may include one or more other interfaces (e.g., touchscreen, keypad, keyboard, microphone, camera, etc.). For example, the communication interface 994 may enable a user to interact with the electronic device 976.

The various components of the electronic device 976 may be coupled together by one or more buses, which may include a power bus, a control signal bus, a status signal bus, a data bus, etc. For the sake of clarity, the various buses are illustrated in FIG. 9 as a bus system 998.

EXAMPLE CLAUSES

Implementation examples are described in the following numbered clauses:

Clause 1: A wireless communication device, comprising a processor configured to determine a switch between an independent mode and a concurrency mode, and a transmitter configured to send a communication capability signal to a base station in response to the switch, wherein the communication capability signal indicates a resource communication capability adjustment for a first service.

Clause 2: The wireless communication device of clause 1, wherein the switch is from the independent mode to the concurrency mode.

Clause 3: The wireless communication device of clause 2, wherein the communication capability signal is a channel quality indicator (CQI) corresponding to the first service, wherein the CQI indicates that a carrier allocated to the first service is inoperable.

Clause 4: The wireless communication device of clause 3, wherein the processor is configured to drop the carrier for the first service, and adjust a setting to communicate with a second service on the carrier.

Clause 5: The wireless communication device of any one of clauses 2 through 4, wherein the communication capability signal is a rank indicator (RI) corresponding to the first service, wherein the RI indicates that a layer allocated to the first service is inoperable.

Clause 6: The wireless communication device of clause 5, wherein the processor is configured to adjust a setting to communicate with a second service using a stream or layer released based on the RI.

Clause 7: The wireless communication device of any one of clauses 1 through 6, wherein the transmitter is configured to send a detach signal to the base station in response to the switch.

Clause 8: The wireless communication device of clause 7, wherein the communication capability signal is an attachment capability signal that indicates a second resource capability that is different from a first resource capability used before sending the detach signal.

Clause 9: The wireless communication device of any one of clauses 1 through 8, wherein the transmitter is configured to send a tracking area update signal to the base station in response to the switch.

Clause 10: The wireless communication device of any one of clauses 1 through 9, wherein the switch is from the concurrency mode to the independent mode.

Clause 11: The wireless communication device of any one of clauses 1 through 10, wherein the first service corresponds to a first subscriber identity module (SIM), and wherein the processor is configured to determine the switch in response to a second SIM activation.

Clause 12: The wireless communication device of any one of clauses 1 through 11, wherein the switch is between single subscriber identity module (SIM) and single SIM concurrent with cellular vehicle to everything (C-V2X), is between fifth-generation wireless (5G) and 5G concurrent with fourth-generation wireless (4G) dual SIM dual active (DSDA), is between 5G and 5G concurrent with 5G DSDA, or is between 5G and 5G concurrent with 4G DSDA and C-V2X.

Clause 13: The wireless communication device of any of clauses 1 through 12, wherein the adjustment is based on an observation period.

Clause 14: A method performed by a wireless communication device, comprising determining a switch between an independent mode and a concurrency mode, and sending a communication capability signal to a base station in response to the switch, wherein the communication capability signal indicates a resource communication capability adjustment for a first service.

Clause 15: The method of clause 14, wherein the switch is from the independent mode to the concurrency mode.

Clause 16: The method of clause 15, wherein the communication capability signal is a channel quality indicator (CQI) corresponding to the first service, wherein the CQI indicates that a carrier allocated to the first service is inoperable.

Clause 17: The method of clause 16, further comprising dropping the carrier for the first service, and adjusting a setting to communicate with a second service on the carrier.

Clause 18: The method of any one of clauses 15 through 17, wherein the communication capability signal is a rank indicator (RI) corresponding to the first service, wherein the RI indicates that a layer allocated to the first service is inoperable.

Clause 19: The method of clause 18, comprising adjusting a setting to communicate with a second service using a stream or layer released based on the RI.

Clause 20: The method of any one of clauses 14 through 19, further comprising sending a detach signal to the base station in response to the switch.

Clause 21: The method of clause 20, wherein the communication capability signal is an attachment capability signal that indicates a second resource capability that is different from a first resource capability used before sending the detach signal.

Clause 22: The method of any one of clauses 14 through 21, further comprising sending a tracking area update signal to the base station in response to the switch.

Clause 23: The method of any one of clauses 14 through 22, wherein the switch is from the concurrency mode to the independent mode.

Clause 24: The method of any one of clauses 14 through 23, wherein the first service corresponds to a first subscriber identity module (SIM), and wherein method comprises determining the switch in response to a second SIM activation.

Clause 25: The method of any of one clauses 14 through 24, wherein the switch is between single subscriber identity module (SIM) and single SIM concurrent with cellular vehicle to everything (C-V2X), is between fifth-generation wireless (5G) and 5G concurrent with fourth-generation wireless (4G) dual SIM dual active (DSDA), is between 5G and 5G concurrent with 5G DSDA, or is between 5G and 5G concurrent with 4G DSDA and C-V2X.

Clause 26: The method of any one of clauses 14 through 25, wherein the adjustment is based on an observation period.

Clause 27: A non-transitory tangible computer-readable medium storing computer-executable code, comprising code for causing a processor to determine a switch between an independent mode and a concurrency mode, and code for causing the processor to control a transmitter to send a communication capability signal to a base station in response to the switch, wherein the communication capability signal indicates a resource communication capability adjustment for a first service.

Clause 28: The computer-readable medium of clause 27, wherein the communication capability signal is a channel quality indicator (CQI) corresponding to the first service, wherein the CQI indicates that a carrier allocated to the first service is inoperable.

Clause 29: An apparatus, comprising means for determining a switch between an independent mode and a concurrency mode, and means for sending a communication capability signal to a base station in response to the switch, wherein the communication capability signal indicates a resource communication capability adjustment for a first service.

Clause 30: The apparatus of clause 29, wherein the communication capability signal is a channel quality indicator (CQI) corresponding to the first service, wherein the CQI indicates that a carrier allocated to the first service is inoperable.

The term "determining" encompasses a wide variety of actions and, therefore, "determining" can include calculating, computing, processing, deriving, investigating, looking up (e.g., looking up in a table, a database, or another data structure), ascertaining and the like. Also, "determining" can include receiving (e.g., receiving information), accessing (e.g., accessing data in a memory) and the like. Also, "determining" can include resolving, selecting, choosing, establishing, and the like.

The phrase "based on" does not necessarily mean "based only on." In other words, the phrase "based on" may describe "based only on" and/or "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example and not limitation, a computer-readable medium may comprise RAM, ROM, EEPROM, compact disc read-only memory (CD-ROM) or other optical disk storage, magnetic disk storage or other magnetic storage devices, or any other medium that can be used to carry or store program code in the form of instructions and/or data structures and that can be accessed by a computer. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers. A computer-readable medium may be tangible and non-transitory. The term "computer-program product" refers to a computing device or processor in combination with code or instructions (e.g., a "program") that may be executed, processed, or computed by the computing device or processor. As used herein, the term "code" may refer to software, instructions, code, or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, can be downloaded, and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

As used herein, the term "and/or" may mean one or more items. For example, the phrase "A, B, and/or C" may mean any of: only A, only B, only C, A and B (but not C), B and C (but not A), A and C (but not B), or all of A, B, and C. As used herein, the phrase "at least one of" may mean one or more items. For example, the phrase "at least one of A, B, and C" or the phrase "at least one of A, B, or C" may mean any of: only A, only B, only C, A and B (but not C), B and C (but not A), A and C (but not B), or all of A, B, and C. As used herein, the phrase "one or more of" may mean one or more items. For example, the phrase "one or more of A, B, and C" or the phrase "one or more of A, B, or C" may mean any of: only A, only B, only C, A and B (but not C), B and C (but not A), A and C (but not B), or all of A, B, and C.

It is to be understood that the claims are not limited to the precise configuration and components illustrated above. Various modifications, changes, and variations may be made in the arrangement, operation, and details of the systems, methods, and apparatus described herein without departing from the scope of the claims. For example, one or more of the operations, functions, elements, aspects, etc., described herein may be omitted or combined.

What is claimed is:

1. A wireless communication device, comprising:
   one or more processors individually or collectively configured to execute instructions stored on one or more memories and to cause the wireless communication device to:
   determine a switch between an independent mode and a concurrency mode; and
   send a communication capability signal and a detach signal to a base station in response to the switch, wherein:
      the communication capability signal indicates a resource communication capability adjustment for a first service corresponding to a first subscriber identity module (SIM),
      the communication capability signal is an attachment capability signal that indicates a second resource capability that is different from a first resource capability used before sending the detach signal; and
      the one or more processors are further configured to cause the wireless communication device to determine the switch in response to insertion or activation of a second SIM in the wireless communication device.

2. The wireless communication device of claim 1, wherein the switch is from the independent mode to the concurrency mode.

3. The wireless communication device of claim 2, wherein:
the communication capability signal is a channel quality indicator (CQI) corresponding to the first service, and
the CQI indicates that a carrier allocated to the first service is inoperable.

4. The wireless communication device of claim 3, wherein the one or more processors are further configured to cause the wireless communication device to:
drop the carrier for the first service; and
adjust a setting to communicate with a second service on the carrier.

5. The wireless communication device of claim 2, wherein:
the communication capability signal is a rank indicator (RI) corresponding to the first service, and
the RI indicates that a layer allocated to the first service is inoperable.

6. The wireless communication device of claim 5, wherein the one or more processors are further configured to cause the wireless communication device to adjust a setting to communicate with a second service using a stream or layer released based on the RI.

7. The wireless communication device of claim 1, wherein the switch is from the concurrency mode to the independent mode.

8. The wireless communication device of claim 1, wherein the switch is between:
single subscriber identity module (SIM) and single SIM concurrent with cellular vehicle to everything (C-V2X),
fifth-generation wireless (5G) and 5G concurrent with fourth-generation wireless (4G) dual SIM dual active (DSDA),
5G and 5G concurrent with 5G DSDA, or
5G and 5G concurrent with 4G DSDA and C-V2X.

9. The wireless communication device of claim 1, wherein the adjustment is based on an observation period.

10. A method for wireless communication performed by a wireless communication device, comprising:
determining a switch between an independent mode and a concurrency mode; and
sending a communication capability signal and a detach signal to a base station in response to the switch, wherein:
the communication capability signal indicates a resource communication capability adjustment for a first service corresponding to a first subscriber identity module (SIM),
the communication capability signal is an attachment capability signal that indicates a second resource capability that is different from a first resource capability used before sending the detach signal; and
determining the switch comprises determining the switch in response to insertion or activation of a second SIM in the wireless communication device.

11. The method of claim 10, wherein the switch is from the independent mode to the concurrency mode.

12. The method of claim 11, wherein:
the communication capability signal is a channel quality indicator (CQI) corresponding to the first service, and
the CQI indicates that a carrier allocated to the first service is inoperable.

13. The method of claim 12, further comprising:
dropping the carrier for the first service; and
adjusting a setting to communicate with a second service on the carrier.

14. The method of claim 11, wherein:
the communication capability signal is a rank indicator (RI) corresponding to the first service, and
the RI indicates that a layer allocated to the first service is inoperable.

15. The method of claim 14, further comprising adjusting a setting to communicate with a second service using a stream or layer released based on the RI.

16. The method of claim 10, wherein the switch is from the concurrency mode to the independent mode.

17. The method of claim 10, wherein the switch is between:
single subscriber identity module (SIM) and single SIM concurrent with cellular vehicle to everything (C-V2X),
fifth-generation wireless (5G) and 5G concurrent with fourth-generation wireless (4G) dual SIM dual active (DSDA),
5G and 5G concurrent with 5G DSDA, or
5G and 5G concurrent with 4G DSDA and C-V2X.

18. The method of claim 10, wherein the adjustment is based on an observation period.

19. A non-transitory computer-readable medium for wireless communication by a wireless communication device, comprising:
instructions that, when executed by one or more processors of the wireless communication device, cause the wireless communication device to:
determine a switch between an independent mode and a concurrency mode; and
send a communication capability signal and a detach signal to a base station in response to the switch, wherein:
the communication capability signal indicates a resource communication capability adjustment for a first service corresponding to a first subscriber identity module (SIM),
the communication capability signal is an attachment capability signal that indicates a second resource capability that is different from a first resource capability used before sending the detach signal; and
the instructions further cause the wireless communication device to determine the switch in response to insertion or activation of a second SIM in the wireless communication device.

20. The non-transitory computer-readable medium of claim 19, wherein:
the communication capability signal is a channel quality indicator (CQI) corresponding to the first service, and
the CQI indicates that a carrier allocated to the first service is inoperable.

21. An apparatus, comprising:
means for determining a switch between an independent mode and a concurrency mode; and
means for sending a communication capability signal and a detach signal to a base station in response to the switch, wherein:
the communication capability signal indicates a resource communication capability adjustment for a first service corresponding to a first subscriber identity module (SIM), the communication capability signal is an attachment capability signal that indicates a second resource capability that is different from a first resource capability used before sending the detach signal; and the means for determining the switch comprise means for determining the switch in response to insertion or activation of a second SIM in the apparatus.

22. The apparatus of claim 21, wherein:

the communication capability signal is a channel quality indicator (CQI) corresponding to the first service, and the CQI indicates that a carrier allocated to the first service is inoperable.

\* \* \* \* \*